June 1, 1971    R. E. CAMPBELL ET AL    3,582,276
PROCESS FOR RECOVERING A METAL OXIDE AND SULFUR
DIOXIDE FROM METAL SULFATE
Filed July 22, 1968    5 Sheets-Sheet 1

FIG. 1

INVENTORS
ROY E. CAMPBELL &
EDWIN E. FISHER
BY
their ATTORNEYS

MATERIAL BALANCE CHART

| STREAM NUMBER COMPONENT | H | I | J | K | L | M | N | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|
| $CH_4$ | | | | | | | | | | | | | | | | | | | 855 |
| $H_2$ | | | | | | | | | 991 | 501 | | 45 | 796 | 74 | | | | | |
| $CO$ | | | | | | | | | 405 | | 40 | | 607 | 56 | | | | | |
| $SO_2$ | | | 345 | 94 | 31 | 9 | 9 | | 783 | | 72 | | | | | 87 | 1024 | 3550 | |
| $CO_2$ | | | 250 | | 23 | | | | 1565 | | 145 | | 176 | 16 | | | | | |
| $H_2O$ | | | | | | | | 3710 | 3248 | 937 | 302 | 87 | 769 | 71 | 937 | 23 | 272 | 944 | |
| $N_2$ | | | 405 | 906 | 946 | 991 | 991 | 4574 | | | | | 3248 | 302 | 249 | | | | |
| $O_2$ | | | | | | | | | | | | | | | | | | | |
| $CaSO_4 \cdot 2H_2O$ | 1000 | 1000 | | | | | | | | | | | | | | | | | |
| $CaSO_4$ | | | 1000 | | | | | | | | | | | | | | | | |
| $CaS$ | | | | | | | | | | | | | | | | | | | |
| $CaO$ | | | | 1000 | 1000 | 1000 | 1000 | | | | | | | | | | | | |
| TOTAL | 1000 | 1000 | 1000 | 1000 | 1000 | 1000 | 1000 | 10,130 | 6001 | 1438 | 599 | 132 | 5596 | 519 | 1186 | 110 | 1296 | 4494 | 855 |

INVENTORS
ROY E. CAMPBELL &
EDWIN E. FISHER
BY
their ATTORNEYS

MATERIAL BALANCE CHART

| COMPONENT | STREAM NUMBER | | | | | | | | | | | | | | | | | | | | | | | |
|---|---|---|---|---|---|---|---|---|---|---|---|---|---|---|---|---|---|---|---|---|---|---|---|---|
| | O | P | Q | R | S | T | U | V | 81 | 82 | 83 | 84 | 85 | 86 | 87 | 88 | 89 | 90 | 91 | 92 | 93 | 94 | 95 | 96 | 97 |
| $CH_4$ | | | | | | | | | | | | | | | | | | | | | | | | | |
| $H_2$ | | | | | | | | | | | | | | | | | | | 213 | | | | | | |
| CO | | | | | | | | | | | | | | | | | | | 67 | | | | | | |
| $SO_2$ | | | | | | | | | | | | | | | | | | | | | | | 186 | | 186 |
| $CO_2$ | | | | | | | | | 979 | 129 | 107 | 22 | | 748 | | | | 88 | 102 | | | | | |
| $H_2O$ | | | | | | | | | 480 | 74 | | 74 | | | | | | 7 | 422 | | 496 | | | | 2372 |
| $N_2$ | | | | | | | | | 2168 | 310 | 213 | 310 | | 1490 | 213 | 1490 | | 552 | 1922 | 321 | | 1240 | | 1750 | 1750 |
| $O_2$ | | | | | | | | | 1690 | 213 | | | | | 57 | 396 | | 97 | | | | | | 461 | 96 |
| $CaSO_4 \cdot 2H_2O$ | 1000 | | | | | | | | | | | | | | 453 | | | | | | | | | | |
| $CaSO_4$ | | 1000 | 1000 | 385 | 150 | 73 | 21 | 21 | | | | | | | | | | | | | | | | | |
| CaS | | | | 102 | 850 | 872 | 979 | 979 | | | | | | | | | | | | | | | | | |
| CaO | | | | | | 55 | | | | | | | | | | | | | | | | | | | |
| TOTAL | 1000 | 1000 | 1000 | 1000 | 1000 | 1000 | 1000 | 1000 | 5317 | 726 | 320 | 406 | 2156 | 2238 | 270 | 1886 | 384 | 2344 | 2446 | 321 | 496 | 1240 | 186 | 2211 | 4404 |

INVENTORS
ROY E. CAMPBELL &
EDWIN E. FISHER
BY
their ATTORNEYS

United States Patent Office 3,582,276
Patented June 1, 1971

3,582,276
PROCESS FOR RECOVERING A METAL OXIDE AND SULFUR DIOXIDE FROM METAL SULFATE
Roy Edwin Campbell and Edwin Eddie Fisher, Midland, Tex., assignors to Elcor Chemical Corporation, Midland, Tex.
Filed July 22, 1968, Ser. No. 746,638
Int. Cl. C01b *17/50, 17/72*
U.S. Cl. 23—177
14 Claims

ABSTRACT OF THE DISCLOSURE

A metal sulfate is converted to a metal oxide and sulfur dioxide by subjecting it to a series of reduction and oxidation steps. During the reduction steps, the sulfate present is converted to sulfur dioxide, the metal sulfide and the metal oxide. The subsequent oxidizing step converts the metal sulfide to sulfur dioxide, metal oxide, and a small amount of metal sulfate. The sulfur dioxide is collected in any suitable manner, and the reduction and oxidation cycle is repeated until a metal oxide of desired purity is obtained.

---

This invention relates to a process of recovering sulfur in the form of sulfur dioxide from a metal sulfate and, particularly, to a procedure by which a metal sulfate is converted to a commercially usable metal oxide and a stream of sulfur dioxide.

The current high level of sulfur consumption in this country, coupled with the rapid depletion of Frasch sulfur deposits has awakened interest in other mineral sources of sulfur. The present invention is concerned with an improved process for obtaining sulfur in the form of a relatively rich stream of sulfur dioxide from metal sulfates. Calcium sulfate, either in the form of gypsum or anhydrite, is of particular interest because of its widespread occurrence in large quantities and because it has the potential of producing both a good quality calcium oxide as a solid, useful coproduct together with sulfur dioxide.

Calcium sulfate and other metal sulfates have been considered as potential sources of large quantities of sulfur and sulfuric acid for many years, but the high cost of converting these sulfates using known methods has generally prevented their large-scale use. One process employed in Europe produces sulfuric acid from anhydrite by a process in which a mixture of anhydrite, coke and shale are heated to a sintering temperature in a rotary kiln. Sulfur dioxide is driven off and recovered for conversion into sulfuric acid, and the residue or clinker is used for portland cement.

Another process developed at the turn of the century is described in French Pat. No. 375,469 published July 10, 1907. In accordance with the French patent, calcium sulfate is first treated with reducing gases to form calcium sulfide, carbon dioxide and water in accordance with the following equations:

$$CaSO_4 + 4H_2 \rightarrow CaS + 4H_2O$$

$$CaSO_4 + 4CO \rightarrow CaS + 4CO_2$$

$$CaSO_4 + CH_4 \rightarrow CO_2 + 2H_2O + CaS$$

The calcium sulfide is then ground and combined with water to form a slurry. Carbon dioxide is collected from the first reaction, and then contacted with the calcium sulfide slurry to cause a reaction in accordance with the following equation:

$$CaS + CO_2 + H_2O \rightarrow H_2S + CaCO_3$$

The stream of hydrogen sulfide obtained as a product of the reaction is converted to elemental sulfur by partially oxidizing it in the well-known manner, and the calcium carbonate residue is discarded.

A process for the joint manufacturing of portland cement clinker, sulfur and hydrogen sulfide is described in U.S. Pat. No. 2,863,726. A mixture of calcium sulfate, alumina and silica is burned in a rotary kiln in a reducing atmosphere to produce gases containing sulfur and hydrogen sulfide, together with a calcine containing a small amount of calcium sulfide. The sulfur and hydrogen sulfide are recovered as elemental sulfur, and the calcine is roasted in a second rotary kiln in an oxidizing atmosphere. Residual calcium sulfide is oxidized to calcium sulfate and the total solids are partially fused and converted to a portland cement clinker containing less than 2.5 percent $SO_3$ (as $CaSO_4$).

Still another process of recent interest is disclosed in U.S. Pat. No. 3,087,790 to Wheelock et al. In accordance with this patent, calcium sulfate is subjected to reducing gases at temperatures in the range of 2,150° to 2,250° F. to provide calcium oxide substantially free of calcium sulfide. This is accomplished by using a specific reducing gas mixture in combination with the specific temperature range given above. The reducing gas mixture comprises carbon dioxide, water vapor and inert gas as well as the reducing gases. A typical natural gas burned with 75 to 95 percent air provides a reducing gas mixture useful in accordance with the process of the invention. The sulfur dioxide driven off by the reaction is collected for subsequent conversion to sulfuric acid.

It has now been found that an improved process for obtaining sulfur from a metal sulfate is provided by subjecting the sulfate to a series of reduction and oxidation steps. The first reduction step produces sulfur dioxide as an effluent gas and a mixture of solids comprising the metal oxide, the metal sulfide, and unreacted metal sulfate. The oxidation step converts the metal sulfide to sulfur dioxide and a small amount of metal sulfate. The sulfur dioxide from both the reduction and oxidation reactions are collected as relatively rich streams and the sulfur dioxide is converted to sulfuric acid by well-known procedures. The cycle of reduction and oxidation steps may be repeated until the metal oxide is sufficiently free of the metal sulfide and sulfate to satisfy the specifications of the ultimate consumer.

While this new process has several desirable features, its most important benefit is that it allows the production of sulfur dioxide and a metal oxide at a substantially lower cost than the prior art processes described above. In addition, the calcium oxide or other metal oxide obtained is of an excellent quality and by repeatedly subjecting it to the cycle of reduction and oxidation stages, it may be made as pure as desired. A wide variety of reducing gases may be used. The sulfur dioxide concentration in the combined streams of off-gases make the production of sulfuric acid therefrom economically feasible and the process has the possibility that will permit the production of a substantially pure sulfur dioxide stream where pure oxygen is used as the oxidizing gas.

We have also found that reactions forming sulfur dioxide within the solid system $CaSO_4$—$CaS$—$CaO$ at temperatures in the range of 2,000° F. to 2,500° F. are limited primarily by the availability of heat energy. Equilibrium and kinetic factors are of secondary importance. The key to economical conversion of calcium sulfate is the supplying of large quantities of heat to the reactants at this high temperature range and the designing of a process to approach the ideal case as closely as possible by increasing heat exchange between reactants to a maximum and minimizing heat loss from the reaction site.

Others have presented processes with various benefits and advantages, but none have approached the ideal system. Early workers converted calcium sulfate by high temperature oxidizing conditions, but the sulfur dioxide was driven off in a stream of such low concentration as to be unusable and the calcium oxide was subjected to such a high temperature that it was "dead-burned" or relatively unreactive. Others developed processes using reducing atmospheres and additives which converted the calcium oxide to cement clinker. These additives cause the reactions to proceed at somewhat lower temperatures and offer the advantage of producing a useful cement byproduct. However, this also introduced some disadvantages. For example, the cost of procuring, handling, storing, and blending of the additives such as $SiO_2$, $Fe_2O_3$, and $Al_2O_3$ partially offset the benefits of the useful cement byproduct, especially if the chosen locality could not consume large quantities of cement. Another effect of the additives was to partially fuse the solids at these lower operating temperatures, making it desirable to use a rotating kiln for the reactor stage. Rotating kilns are mechanically useful for reacting a partially fused mass of solids, but they are expensive, inefficient from a solids-gas contacting sense, and are subject to high heat losses.

Later developments include various processes which convert calcium sulfate to hydrogen sulfide or elemental sulfur. Since well over one-half of all sulfur and hydrogen sulfide produced in this country is converted to sulfuric acid, it is desirable to reduce the calcium sulfate to sulfur dioxide and convert the sulfur dioxide to sulfuric acid. This requires considerably less fuel and reductants than completely reducing the sulfate to hydrogen sulfide or elemental sulfur, which is more than likely to be converted to sulfuric acid before use. This is important, since the cost of fuel for reductants and heat is the major cost of any sulfate conversion process.

Table I illustrates the ideal fuel consumption for processes which reduce calcium sulfate, in the form of gypsum, to the different products. Ideally, the fuel cost to make sulfuric acid from calcium sulfate via sulfur dioxide can be about one-half the fuel cost per unit of sulfur as it is to make elemental sulfur from calcium sulfate via hydrogen sulfide.

TABLE I

Fuel consumption for ideal [1] processes

Process description:

Gypsum reacts with methane to form hydrogen sulfide:
$CaSO_4 \cdot 2H_2O + CH_4 \rightarrow$
$CO_2 + CaO + H_2S + 3H_2O$ _____ [2] 1.382

Gypsum reacts with methane to form elemental sulfur:
$4CaSO_4 \cdot 2H_2O + 3CH_4 \rightarrow$
$4CaO + 4S + 3CO_2 + 14H_2O$ _____ [2] 1.106

Gypsum reacts with methane to form sulfur dioxide:
$4CaSO_4 \cdot 2H_2O + 3CH_4 \rightarrow$
$4CaO + 4SO_2 + CO_2 + 10H_2O$ _____ [2] 0.736

[1] Ideal process is defined as one proceeding to completion at 25° C. and under adiabatic conditions.
[2] Moles methane consumed per mole of gypsum converted.

Methane was chosen in Table I to illustrate the point because it is similar to typical natural gas streams, and the latter are one of the most common fuels in this country.

Under adiabatic conditions, it would be theoretically possible to operate the process of our invention in the range of 0.85 mole of methane per mole of gypsum converted. Ideal conditions are not reached in practice, but by following the process of this invention, sulfur dioxide is produced at a fuel cost ranging from 0.95 to 1.15 moles of methane per mole of gypsum converted. While gypsum and anhydrite are interchangeable with this process, when anhydride is used, the heat load is reduced slightly because there is no water of crystallization to remove.

Metal sulfates which may be treated according to the process of the present invention include aluminum sulfate, barium sulfate, cadmium sulfate, calcium sulfate, cerium sulfate, chromium sulfate, cobalt sulfate, potassium sulfate, magnesium sulfate, lithium sulfate, sodium sulfate, nickel sulfate, lead sulfate, strontium sulfate, thorium sulfate, titanium sulfate, vanadium sulfate, and zinc sulfate.

The invention is particularly useful for reducing alkaline earth metal sulfates such as calcium sulfate, magnesium sulfate, barium sulfate, and strontium sulfate. Calcium sulfate, in the form of gypsum and anhydrite, is of the most immediate commercial interest. However, it is recognized that the process disclosed herein, with suitable variations in conditions, is applicable to the other metal sulfates listed above. The invention is described herein in terms of a process of recovering sulfur dioxide and calcium oxide from gypsum.

The invention is more particularly described with reference to the accompanying drawings in which:

FIG. 1 is a flow diagram showing diagrammatically the process of the present invention;

Figures 2, 2A:
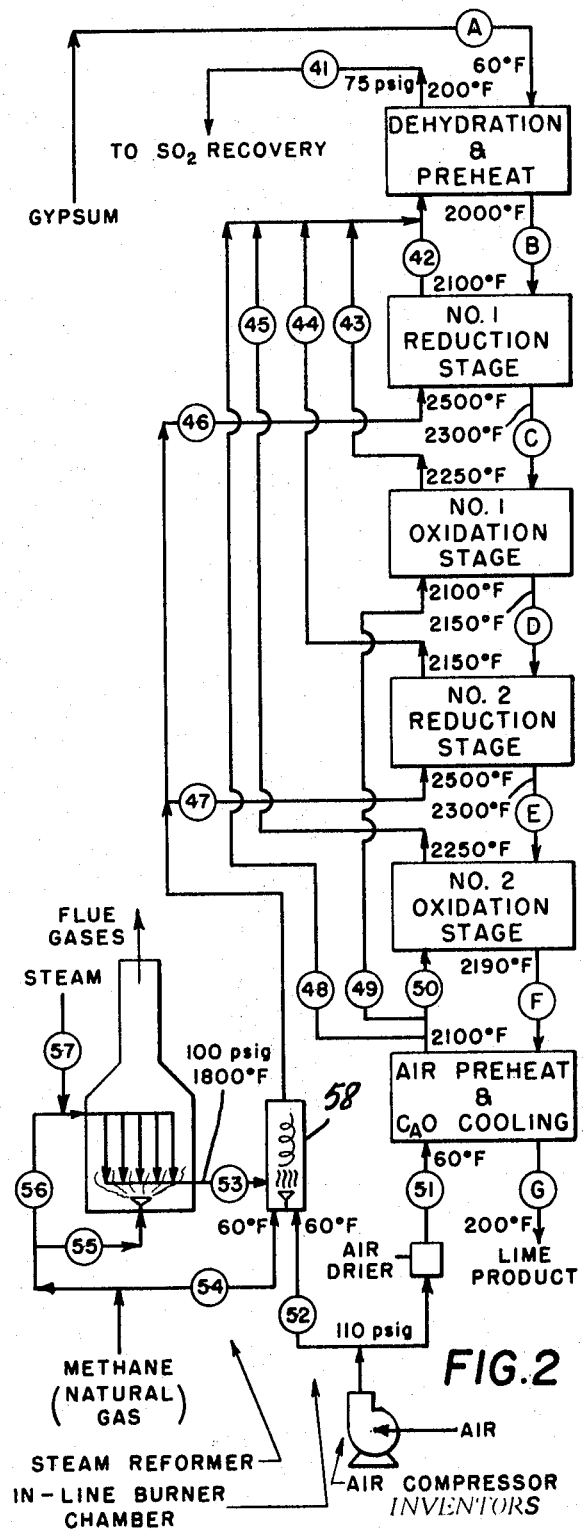
FIG. 2 is a flow diagram and material balance showing an embodiment of the process of the present invention described in Example I using a continuous vertical shaft furnace and a reducing gas prepared from natural gas (methane)

Referring now to FIG. 1, crushed gypsum, preferably as uniformly sized particles of from about ¼ inch to 1½ inch in maximum dimension, is dehydrated and preheated as shown at block 11. The gypsum is preferably heated by direct contact with hot gases. These hot gases may be any gas stream of hot sulfur dioxide-containing gases or another source of hot gases from a subsequent process step may be used for efficient utilization of process heat.

Under some circumstances, as when gypsum is used with concentrated reduction gases, and oxygen or enriched air as the oxidizing gas, there will not be sufficient heat energy in the combined outlet gas stream to completely dehydrate the gypsum and preheat it to closely approach the reaction temperature of the first reduction stage. In this case, all or part of the dehydration and preheating stage may be accomplished by burning a fuel and passing the combustion gases up through the gypsum. On the other hand, if anhydrite is used, there is no water of crystallization to be removed and the total heat energy requirement for this step is reduced by approximately one-third. This reduction eliminates the need for a separate dehydration stage.

While the temperature of preheating is not critical, a more economical process is obtained where the gypsum is preheated to a relatively high temperature approaching the temperature of the reduction reaction before it is contacted with the hot reducing gases in the next step of the process. Measures should be taken, of course, to prevent heat loss from the preheated gypsum while it is conveyed from the dehydration step to the next stage of the process. Positioning the preheating and dehydration stage at the top of a shaft furnace provides for minimum heat losses of this nature.

In the embodiment shown in FIG. 1, air is used as the oxidizing gas and a reducing gas is used which provides sufficient heat energy in the combined sulfur dioxide-containing gases to completely dehydrate the gypsum and preheat it to a temperature near the reaction temperature of the first reduction stage.

In the first reduction stage, shown as block 12, the calcium sulfate is contacted with a reducing gas within a reaction zone temperature of 2,000 to 2,500° F., preferably about 2,200° F.

At temperatures below tbout 2,000° F., the reactions proceed more slowly, requiring larger sized equipment, and the production of sulfur dioxide is no longer closely controlled by the availability of heat. Equilibrium and kinetic factors limit the amount of sulfur recovered as sulfur dioxide and other side reactions become more significant. These side reactions cause an increasing percentage of the sulfur in the outlet gas product to be in the form of elemental sulfur and hydrogen sulfide, and the total percentage of sulfur removed in the effluent gases decreases with decreasing temperatures.

At temperatures near 2,500° F. and above, fusion of the solids occurs and readily causes severe operating problems. Usually, impurities will lower the temperature at which fusion will begin, additionally compounding the problem.

From the first reduction stage, 12, the effluent gases are principally sulfur dioxide, carbon dioxide, and water, as well as unreacted hydrogen and carbon monoxide in small amounts. The makeup of the effluent gases, of course, depends upon the nature of the reducing gases used. For example, use of a large amount of air introduces large volumes of $N_2$.

A number of reductants can be used to reduce calcium sulfate. A few are normally preferred for use in the process of this invention because of economics, and the examples describe the use of mixtures of hydrogen and carbon monoxide, which are among the most economical and most readily available of the reducing gases. Methane and other hydrocarbon gases are readily available and inexpensive, but their reactions are so highly endothermic compared to hydrogen and carbon monoxide, that the hydrocarbon gases are usually converted to the latter gases before being used. At the desired operating temperatures used to reduce calcium sulfate in accordance with this invention, equilibrium prevents any appreciable amount of methane or other hydrocarbons from existing in the stream of reducing gases. It is recognized, however, that many reducing gases can be used in carrying out the process of this invention including those prepared from carbon, coke, coal, or other solid carbonaceous materials. The reducing gases can be prepared in a separate step, as in block 10. Alternatively, the solid carbonaceous materials may enter the reaction zone with the calcium sulfate and generate reducing gases within the reaction zone. In still another embodiment, the solid carbonaceous materials may enter into the reduction of calcium sulfate directly as a reductant.

Referring again to FIG. 1, a stream of reducing gases containing hydrogen and carbon monoxide is prepared in block 10. This step may be accomplished by steam reforming or partial oxidation of hydrocarbons, coal, or any other fuel containing carbon and hydrogen. Table II presents the resulting reactions which are thought to occur in block 12, the first reduction stage, and in all succeeding reduction stages:

TABLE II

Reactions within reduction stage

| | Approximate heat of reaction released or required [1] |
|---|---|
| (A) $CaSO_4+H_2 \rightarrow CaO+H_2O+SO_2$ | +47 required. |
| (B) $CaSO_4+CO \rightarrow CaO+CO_2+SO_2$ | +40 required. |
| (C) $CaSO_4+4H_2 \rightarrow CaS+4H_2O$ | −24 released. |
| (D) $CaSO_4+4CO \rightarrow CaS+4CO_2$ | −52 released. |

[1] At 2,200° F., kcal./gram mole.

When a reduction stage is operated near 2,200° F., reactions A, B, C, and D are thought to be the primary reactions occurring. Any important concept of this process is that the reactions requiring heat to produce sulfur dioxide are supplied with that heat primarily by the reactions producing calcium sulfide, as well as by the sensible heat of the incoming gas and solids. The availability of heat at the reaction site limits the reactions converting sulfate to sulfur dioxide, and any means which transfers heat energy into the reacting solids will increase the yield of sulfur dioxide in each reduction stage.

The approximate heat of reaction for each of the reactions occurring in the reduction stages is presented in Table II. Upon inspection of the heats of reaction, it is seen that carbon monoxide is more desirable as a reducing gas than hydrogen for the production of sulfur dioxide. If pure carbon monoxide were used, for example, in an ideal, adiabatic reaction zone, it will convert 117 percent more calcium sulfate to sulfur dioxide as the same volume of hydrogen under the same conditions. Thus, it is advantageous to provide a reducing gas with the highest ratio of carbon monoxide-to-hydrogen that economics will permit. The higher the carbon monoxide-to-hydrogen ratio, the higher the sulfur dioxide gas concentration can be, and the lower the number of reduction stages needed for a desired level of conversion. Regardless of this advantage for carbon monoxide, a stream of pure hydrogen works quite well and is economically attractive. If pure hydrogen is used, the gas leaving the reduction stage contains sulfur dioxide and water vapor. By removing the water through condensation or other means, a very rich stream of sulfur dioxide is prepared for direct sale or further processing.

Reducing gases containing pure carbon monoxide or pure hydrogen are not generally available and mixtures of hydrogen and carbon monoxide provide quite acceptable results. One suitable mixture is formed by steam reforming of natural gas or other hydrocarbons. Reformed natural gas contains about 20 percent carbon monoxide and 80 percent hydrogen plus steam and smaller amounts of carbon dioxide and inert gases present in the natural gas. The use of reformed natural gas is described in Example III below and in FIG. 4. Another suitable mixture of reducing gases is formed by partial oxidation of coal or hydrocarbons. Partial oxidation of nautral gas is described in Example II below and in FIG. 3.

Another method of preparing a suitable reducing gas is shown in Example I and in FIG. 2. This method involves use of steam reforming to obtain a stream of highly concentrated reducing gas, then the use of direct combustion heating to increase the temperature of the stream by burning more natural gas and air in an in-line burner chamber. Some of the heat of combustion increases the sensible heat of the gas stream and some of the heat of combustion supplies the endothermic heat for the reaction:

$$H_2+CO_2 \rightarrow H_2O+CO$$

This supplemental use of heat of combustion is very efficient; it increases the carbon monoxide-to-hydrogen ratio of the reducing gas stream as well as its temperature and thereby increases the quantity of heat available to make sulfur dioxide in the reaction zones.

Following the first reduction stage, block 12, the solids which now comprise a mixture of calcium sulfide, calcium sulfate, and calcium oxide are carried to the first oxidation stage, block 13 of FIG. 1. In this stage, oxygen either in the form of pure oxygen or as an oxygen-containing gas such as air is contacted with the hot solid products from the first reduction stage. The calcium oxide is inert and simply increases in temperature during this stage, thus acting as a heat carrier. Some of the calcium sulfate passes through this stage unchanged in the same manner as the calcium oxide. The calcium sulfide is either oxidized to sulfur dioxide and calcium oxide or is converted to calcium sulfate. Some of the calcium sulfate enters into a reaction with calcium sulfide to produce calcium oxide and sulfur dioxide. The reactions which are thought to take place in the oxidation step are summarized in Table III:

TABLE III
Reactions within the oxidation stage

|     | Approximate heat of reaction released or required [1] |
| --- | --- |
| (A) $CaS + 1\frac{1}{2}O_2 \to CaO + SO_2$ | $-108$ released. |
| (B) $CaS + 2O_2 \to CaSO_4$ | $-215$ released. |
| (C) $CaS + CaSO_4 \to 4CaO + 4SO_2$ | $+212$ required. |
| (D) $CaSO_4 \to CaO + SO_2 + \frac{1}{2} + O_2$ | $+106$ required. |

[1] At 2,200° F., kcal./gram mole.

Of the calcium sulfide which reacts with oxygen, about 25 to 40 percent oxidizes to calcium oxide and sulfur dioxide in accordance with reaction A. The balance follows reaction B. Higher operating temperatures increases the fraction of calcium sulfide converted in accordance with reaction A.

At temperatures near 2,000° F. and below, the reactions proceed somewhat more slowly, requiring larger equipment size. At temperatures near 2,500° F. and above, fusion of the solids can occur and cause severe operating problems unless the equipment is especially designed to handle this problem. Usually, impurities will lower the temperature at which fusion will begin. An operating temperature near 2,000° F. is preferred to avoid all these problems. It is also noted that when the temperature is allowed to increase, thermal decomposition of calcium sulfate occurs; see reaction D above. Inasmuch as this reaction is highly endothermic, it will tend to prevent the realization of excessively high temperatures, even though the kinetics and equilibrium factors are not highly favorable. The heat of reaction liberated by reactions A and B supplies the required heat of reaction for reaction C. In an ideal, adiabatic reaction stage operating at 2,200° F., the approximate overall reaction occurring in an oxidation stage is:

$$CaS + O_2 + CaSO_4 \to 2CaO + 2SO_2$$

This formula is an approximation and is not suggestive of the mechanism of the reactions. It is descriptive of the control imposed by an overall energy balance. The actual extent of conversion of the $CaSO_4$ to $SO_2$ per unit of CaS, in the oxidation step, will increase or decrease, depending upon the heat loss allowed by the equipment design and the temperature of the entering gases and solids. An increase in heat loss or decrease in heat contributed by entering gases and solids will result in a decrease in the amount of $CaSO_4$ converted per unit of CaS consumed.

As shown in FIG. 1, the oxidation and reduction stages are then repeated with the hot solids leaving the first oxidation stage in a continuous process. Generally speaking, completion of one ideal cycle of reduction and oxidation will convert up to three-quarters of the original sulfate sulfur to sulfur dioxide. Each succeeding cycle will convert with comparable efficiency the sulfate content then appearing in the solid residue. Two complete cycles convert about 90 percent of the sulfate sulfur to sulfur dioxide. While it may be necessary to repeat the reduction and oxidation stages one or more additional times in order to obtain a calcium oxide product meeting higher purity specifications, the calcium oxide product at the end of the second cycle is generally suitable for most commercial uses.

The combined sulfur dioxide-containing streams from the reduction and oxidation stages of this process may vary widely in concentration of sulfur dioxide, depending upon the choice of reducing and oxidizing gas. The examples presented below indicate the capability of this process to make sulfur dioxide streams well above the concentration required for the manufacture of sulfuric acid, even when using common reducing gas sources and air. Changes in the reducing and oxidizing gas can result in approaching pure sulfur dioxide; thus, this process is flexible enough to be adapted to a wide range of processing economics.

A desirable feature of this process is the opportunity to preheat the incoming air, or other oxidizing gas, by direct contact with the hot calcium oxide product. If high purity calcium oxide is required, the air is dried to prevent the formation of some calcium hydroxide because of the water vapor in the incoming air. If calcium oxide contacts water vapor below approximately 1,075° F., it is possible to form calcium hydroxide.

It is obvious that this process is adaptable to usage with a variety of sulfate sources including not only high and low quality natural sulfate ores, but by-product and waste streams containing sulfates as well.

The process of this invention will be further illustrated by the following examples.

EXAMPLE I

Figure 5:
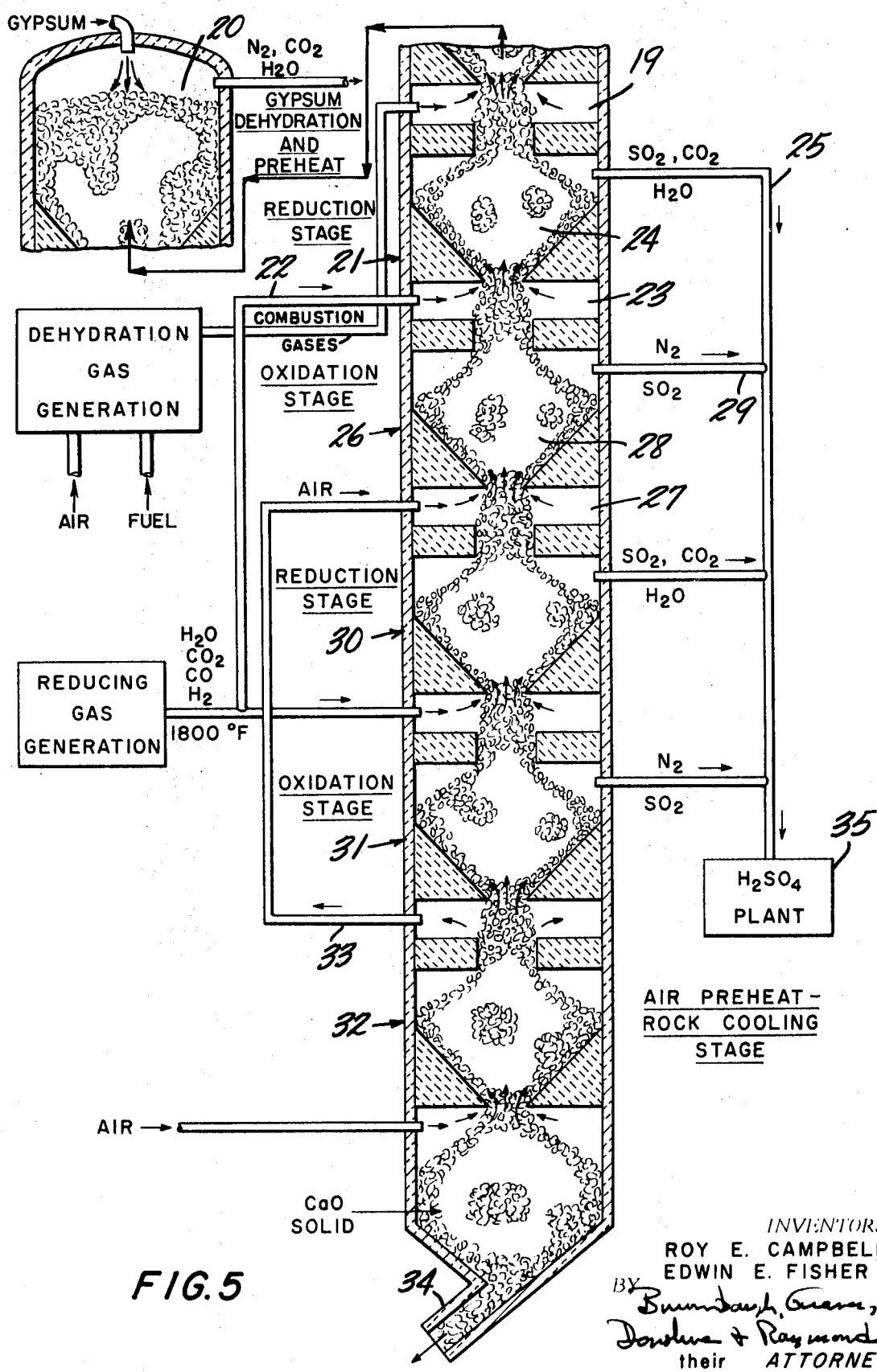
FIG. 5 is a simple diagram of a continuous vertical shaft furnace which has been separated into reduction and oxidation stages for use in the process of FIG. 4.

Referring to FIG. 2 of the drawings, a flow diagram and accompanying material balance chart is given representing an embodiment of the process of this invention using a continuous vertical shaft furnace, as shown in FIG. 5, and a reducing gas prepared by a combination of steam reforming of natural gas with injection heating to obtain a hot and fairly concentrated reducing gas stream. Only two reduction and two oxidation stages are employed in this example, but it is understood that additional cycles of oxidation and reduction stages can be supplied where needed or desired.

The stream of gases in FIG. 2 bear identification numerals 41 through 57. The streams of solids are identified by letters A through G. The material balance chart given in FIG. 2 sets forth, in pound moles, the components of each identified stream.

In accordance with the process of this example, the reducing gas stream, 46, 47, is prepared by combining stream 53 of reformed natural gas at 1,800° F. with the combustion products of an injection heater, 58, to provide reducing gases to the reducing stages of the process at a temperature of 2,500° F. The injection heater also serves to increase the carbon monoxide content of the reducing gas. The reformed natural gas stream 53, as shown by column number 53 in the material balance chart of FIG. 2, has a $H_2:CO$ ratio of about 4:1, whereas the enriched stream 46, 47, has a $H_2:CO$ ratio of about 2.6:1.

As indicated on FIG. 2, crushed gypsum, having a particle size ranging in maximum dimension between about ¼ inch and 1½ inches, is supplied at 60° F. and is dehydrated and preheated by contact with the gaseous reaction products received from subsequent stages in the process, supplied through stream 42 at about 2,100° F.

The temperatures of each of the gas streams and product streams as they pass through the process are given in FIG. 2. Similarly, the pressure of the air stream feeding the streams 52 and 51 is 110 p.s.i.g. The pressure of reducing of reducing gas stream 53 is 100 p.s.i.g. and the pressure of the exiting $CO_2$-rich effluent gases, stream 41, is 75 p.s.i.g.

The reducing gas is introduced into No. 1 Reduction stage at 2,500 ° F. The gases pass upwardly through the descending stream of calcium sulfate particles, which have been introduced into the top of No. 1 Reduction stage at about 2,000° F. The reduction reactions which take place are favorably balanced to provide excess heat of reaction. This heat plus the sensible heat supplied by the incoming reducing gases raises the temperature in the reaction zone to about 2,300° F. Effluent gases leaving the No. 1 Reduction stage at stream 42 have a temperature of about 2,100° F. They are combined with effluent gas streams 43, 44, and 45 from subsequent process steps and are passed through incoming calcium sulfate to serve a dehydrating and preheating function. Stream 48 optionally supplies a small amount of preheated air directly from the air preheat stage to the dehydration and preheat stage, when needed, to assist in heat distribution control for the overall process.

The effluent $SO_2$-containing gases are then carried off through stream 41. The $SO_2$ concentration leaving the final stage of dehydration and preheating through stream 41 is approximately 12 percent by volume $SO_2$. Gas stream 41 is subjected to conventional dust removal and excess water condensation by cooling in steps not shown in the drawing, prior to being introduced into a conventional sulfuric acid plant. After the dust removal and condensation steps, the $SO_2$ concentration in the stream is about 24 percent. This is substantially in excess of the $SO_2$ concentration required for efficient operation of a sulfuric acid plant.

After leaving No. 1 Reduction stage, the solid reaction products, C, at 2,300° F. move on continuously to No. 1 Oxidation stage. The solid reaction products C comprise calcium sulfate, calcium sulfide, and calcium oxide in the molar proportions indicated in column C of the material balance chart for FIG. 2.

Oxidizing air is supplied to No. 1 Oxidation stage at 2,100° F. through stream 49 after being preheated by passing it through the solid product existing at the end of the process as indicated through streams 51 and 50. During No. 1 Oxidation stage, the preheated air passes upwardly through the descending solid particles, and favorable oxidation reactions provide excess heat of reaction. This, together with the sensible heat supplied by the solids coming from the reduction stage, result in a temperature in the reaction zone of approximately 2,200° F. The solids stream D leaves the oxidation step having a temperature of 2,150° F. During the oxidation stage, the solids are converted to calcium sulfate and calcium oxide; the mole pounds of each appearing in the solids stream D at the completion of the oxidation step are indicated in column D of the material balance chart of FIG. 2. The effluent gases from No. 1 Oxidation stage leave that stage through stream 43 at a temperature of 2,250° F., are combined with gas streams 42, 44, and 45, and are used in the dehydration and preheating step. The $SO_2$ values are collected through stream 41 as described above.

The solids stream D is then passed through a second reduction stage and a second oxidation stage under conditions similar to those discussed above and as set forth n FIG. 2. At the end of No. 2 Oxidation stage, the level of calcium sulfate in the solid product stream F is reduced to a low level, as indicated in column F of the material balance chart, and substantially all of the sulfur has been removed from the calcium sulfate as a sulfur dioxide. The calcium oxide is cooled by passage through incoming oxidizing air and exits continuously from the column at a temperature of about 200° F. Care is taken to dry the air used to cool the calcium oxide.

The process of this example is a highly economic procedure by which sulfur dioxide can be obtained from calcium sulfate. On the basis referred to in Table I above, the fuel requirements of this process are about 0.95 mole of methane per mole of gypsum converted.

EXAMPLE II

Figures 3, 3A:
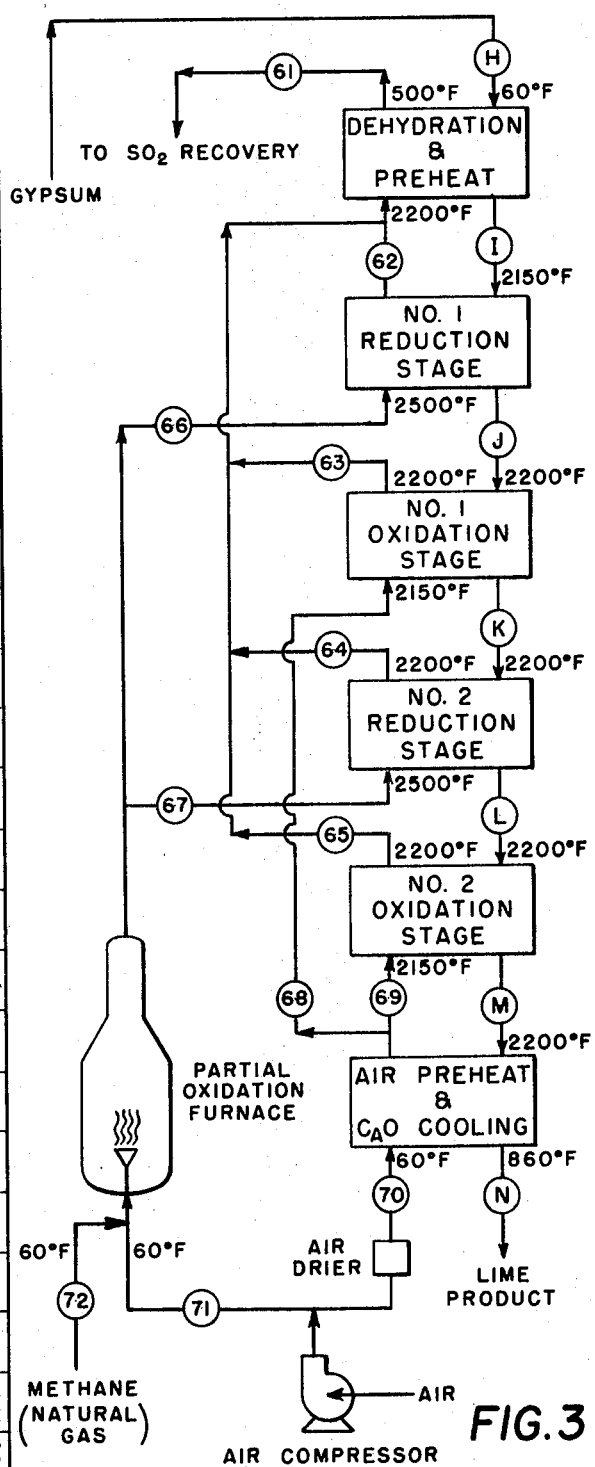
FIG. 3 is a flow diagram and material balance showing another embodiment of the process of the present invention as described in Example II using a continuous vertical shaft furnace and a reducing gas.

Another representative process of the present invention is described in FIG. 3. This process uses a shaft furnace which has been divided into separate reduction and oxidation stages as shown in FIG. 5 of the drawings. The reducing gas in this example is prepared by the partial oxidation of natural gas with air.

The streams of gases in FIG. 3 bear identification numerals 61 through 72. The streams of solids are identified by letters H through N. The material balance chart given in FIG. 3 sets forth, in pound moles, the components of each identified stream.

The process of this example is similar to the process described above for Example I, except for the source of reducing gas. The calcium sulfate is crushed and introduced at ambient temperatures through stream H to the dehydration and preheating step, where it is contacted with effluent gas stream 62 at temperatures of about 2,200° F. to raise the temperature of the calcium sulfate to about 2,150° F. and the sulfate is introduced as stream I into the No. 1 Reduction stage.

The reducing gas is prepared in a partial oxidation furnace using air and natural gas. The partial oxidation furnace prepares a reducing gas having a composition as indicated in columns 66 and 67 of the material balance chart appearing in FIG. 3. This type of reducing gas is characterized by having nearly equal volumes of $H_2$ and CO and a high temperature, both of which features are favorable. In addition, it has a high volume of nitrogen. The reducing gases at 2,500° F. are introduced into the No. 1 Reduction stage and passed upwardly through the descending calcium sulfate particles. The stream of effluent gases 62 having the composition indicated in column 62 of the material balance chart of FIG. 3 is combined with the effluent gas streams 63, 64, and 65, from subsequent stages of the process and, the combined streams of gases are used to dehydrate and preheat the incoming calcium sulfate. The $SO_2$-containing gases are removed from the process as stream 61 and carried to an $SO_2$ recovery stage, not shown.

In accordance with an alternate method of utilizing the partial oxidation reducing gas source, the flow of product gas stream 64 from the No. 2 Reduction stage, may be mixed with and reheated by fresh, hot reducing gas stream 66 and the combined streams 64 and 66 are then used as the reducing gases for the No. 1 Reduction stage. This arrangement may also be utilized with in-line combustion reheating, a concept presented in Example I of FIG. 2. These procedures allow the use of the increasing mass of hot gases in the upper stages where more of the endothermic conversion to $SO_2$ takes place. This procedure allows good heat utilization, more conversion of sulfate to $SO_2$ per stage, and increased operating flexibility.

After leaving No. 1 Reduction stage, the solid material is subjected to No. 1 Oxidation stage in the manner similar to Example I. The preheated air is supplied at a temperature of 2,150° F. and the solid material leaving the oxidation stage at K has the composition indicated in column K of the material balance chart of FIG. 3.

The temperature of each of the gas streams and solid product streams as they pass through the process is indicated at various points on the flow diagram in FIG. 3.

The $SO_2$ concentration leaving the dehydration and preheating stage through stream 61 in the example shown in FIG. 3 has approximately 10 percent by volume $SO_2$. After being subjected to conventional dust removal and excess water condensation by cooling, the gas stream has an $SO_2$ concentration of about 15 percent.

The solids stream K leaving No. 1 Oxidation stage is carried to No. 2 Reduction stage and then to No. 2 Oxidation stage, as shown in FIG. 3. After leaving No. 2 Oxidation stage, the product stream M has a low level of $CaSO_4$ of 9 mole pounds per 1,000 mole pounds of product, indicating CaO of acceptable purity. The cooled solid product leaving by stream N has a temperature of 860° F.

EXAMPLE III

Figures 4, 4A:
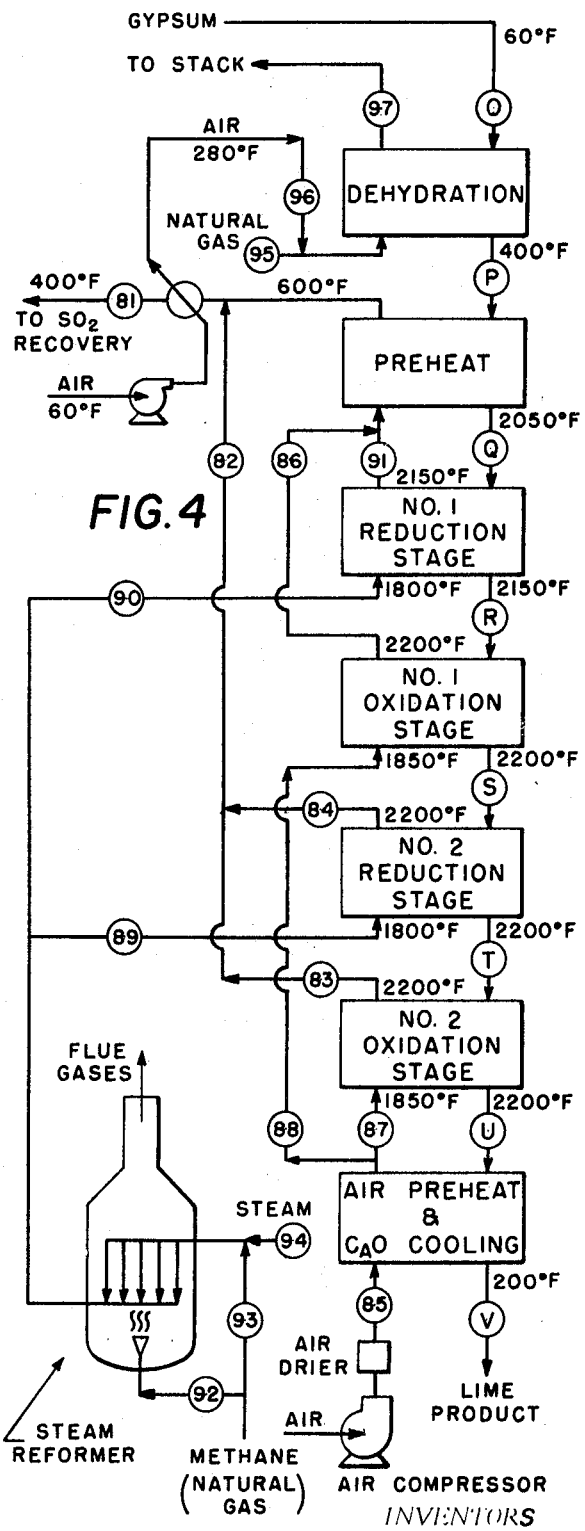
FIG. 4 is a flow diagram and material balance showing another embodiment of the process of the present invention as described in Example III using a continuous vertical shaft furnace and reducing gas.

A third representative process of the present invention is described in FIGS. 4 and 5. FIG. 4 shows a flow diagram and a chart giving a material balance for this process. FIG. 5 depicts an apparatus in the form of a shaft furnace in which the process of this example is carried out. The shaft furnace is divided into a number of stages including a dehydration and preheating stage, two reduction and two oxidation stages, and a rock cooling stage. The apparatus is designed to permit continuous operation of the process. The crushed calcium sulfate is introduced at the top of the shaft furnace, descends by gravity slowly through the various stages in the furnace, where it is subjected to the various process steps to be described and the solids are removed at the bottom. The effluent gases are removed at appropriate locations at the various stages of the process where they are produced.

More particularly, the gypsum particles are introduced at the top of the reactor of FIG. 5 into the gypsum dehydration and preheating stage 20. Combustion gases used to supply the energy for the dehydration and preheating are introduced into the annular space 19 and pass upwardly through the crushed gypsum. After dehydration and preheating, the crushed gypsum moves downwardly into the reduction stage at 21. Reducing gas, comprising reformed methane having 20 percent carbon monoxide and 80 percent hydrogen at 1,800° F. is introduced through conduit 22 into the annular space 23, beneath chamber 24. The reducing gases pass upwardly through the descending stream of gypsum particles from the annular space 23 into chamber 24. The exothermic reaction which takes place between the reducing gas and the gypsum increases the temperature in the reduction stage to about 2,100° F. Effluent gases leaving the top of the gypsum bed are collected and removed through conduit 25.

As the gypsum particles proceed downwardly through the furnace, they enter the first oxidation stage 26. In this stage, preheated air is introduced to the annular space 27 and caused to pass upwardly through the descending gypsum particles into chamber 28. The exothermic nature of the reaction between the air and the hot solids raises the temperature in the oxidation stage to about 2,200° F. The effluent gases from the oxidation reaction are collected above the rock particles in chamber 28 and removed from the oxidation stage through conduit 29.

The gypsum passes downwardly through a second reduction stage 30 and second oxidation stage 31 which operate in the same manner as the first reduction and oxidation stages 21 and 26 respectively. The rock is then cooled in chamber 32 by the passage therethrough of inlet air. The air which is then preheated is then conveyed by means of conduit 33 for use in the first oxidation stage. A portion of the preheated air passes directly in the second oxidation stage through the downwardly descending stream of rock. The solid materials reaching the bottom of the shaft furnace comprise essentially calcium oxide and are removed through exit 34. The effluent gases are collected and conveyed to sulfuric acid plant 35.

The streams of gases in FIG. 4 bear identification numerals 81 through 97. The streams of solids are identified by letters O through V. The material balance chart, also given in FIG. 4, sets forth in pound moles the components of each identified stream.

The process of this example differs from the process described above for FIG. 5 only in the arrangement of the dehydration and preheating stages. In FIG. 5, they are combined, while in FIG. 4, they are separated, the dehydration stage receiving heat from supplemental combustion gases and a heat exchanger while the preheating stage is heated by effluent gases.

Returning to FIG. 4, the calcium sulfate is supplied through stream O to the dehydration step. In the process of this example, heated gases resulting from the combustion of natural gas together with heated air heated by heat exchanger with effluent gases from subsequent steps in the process is used to accomplish dehydration and partial preheating of the calcium sulfate. This arrangement permits introduction of sufficient dehydrating energy without unduly diluting the $SO_2$ off-gas stream 81. As a result, the $SO_2$ content of the stream 81 is 18.41 mole percent. After customary dust removal and water condensation, the dry $SO_2$ stream has about 31 mole percent $SO_2$.

The dehydrated calcium sulfate preheated to about 400° F. is further preheated by direct contact of effluent gases from stream 91.

From the preheat stage, the calcium sulfate is introduced to the No. 1 Reduction stage at a temperature of about 2,050° F. Reduction gases in the form of stream reformed natural gas is supplied at a temperature of 1,800° F.

After passing through the reduction stage, the solid materials are conveyed to No. 1 Oxidation stage, where they are contacted with preheated air at a temperature of 1,850° F. The oxidation reaction raises the temperature of the reactants to about 2,200° F.

The reduction and oxidation stages are repeated, and the calcium oxide product at U is cooled by contact with the air supply stream 85 to the oxidation stages.

The process of this example is an exceptionally economic procedure by which sulfur dioxide can be obtained from calcium sulfate. On the basis referred to in Table I above, the fuel requirements of this process are about 1.15 moles of methane per mole of gypsum converted.

We claim:
1. A process for the recovery of calcium oxide and sulfur dioxide from calcium sulfate which comprises
   (a) passing a reducing gas through particulate calcium sulfate at a temperature within the approximate range of 2,000° F. to 2,500° F. to produce sulfur dioxide, recovering sulfur dioxide from the gaseous effluent and forming a solid product containing calcium oxide, calcium sulfate and calcium sulfide, and
   (b) passing an oxygen-containing gas over the solid product recovered in step (a) at temperatures within the approximate range of 2,000° F. to 2,500° F., recovering the sulfur dioxide from the effluent gases and cooling the resulting calcium oxide product.

2. The process of claim 1, wherein the solid product of step (b) is repeatedly subjected to steps (a) and (b) until the calcium oxide is of desired purity and substantially all of the sulfur has been driven off as sulfur dioxide.

3. The process of claim 1, wherein carbon, coal, or coke is mixed with the calcium sulfate to partially accomplish step (a).

4. The process of claim 1 wherein the oxidation steps are accomplished while the heated oxygen-containing gas and the heated solids are contacted concurrently.

5. The process of claim 1, wherein the solid material passes continuously from reduction to oxidation stages, and wherein the separate identities of the reduction and oxidation atmospheres are maintained by controlling the pressure of the respective atmospheres in the respective stages.

6. A process for the recovery of calcium oxide and sulfuric acid from calcium sulfate comprising the steps of
   (a) subdividing the calcium sulfate;
   (b) dehydrating and preheating the calcium sulfate;
   (c) passing a reducing gas through the dehydrated calcium sulfate at a temperature of about 2,200° F. to produce sulfur dioxide, recovering sulfur dioxide from the gaseous effluent, and forming a solid product containing calcium oxide, calcium sulfide, and some unconverted calcium sulfate,
   (d) passing an oxygen-containing gas over the mixture of calcium oxide, calcium sulfide, and calcium sulfate recovered in step (c) at a temperature of about 2,200° F. to produce sulfur dioxide, and recovering the sulfur dioxide from the effluent gases,
   (e) carrying the sulfur dioxide recovered in steps (c) and (d) to a sulfuric acid plant to prepare sulfuric acid therefrom, and
   (f) cooling the solid product obtained in step (d) to provide calcium oxide.

7. The process of claim 6, wherein the reducing gas is reformed hydrocarbon gas comprising a mixture of about 20% carbon monoxide and about 80% hydrogen, and the reducing gas is introduced into the reduction stage of the process at a temperature of about 1800° F.

8. The process of claim 7, wherein the reformed hydrocarbon gas is enriched by addition of carbon monoxide thereto.

9. The process of claim 8, wherein the carbon monoxide enrichment is accomplished by partial combustion of a hydrocarbon gas in the stream of reducing gases, the enrichment occurring at a point in the process prior to the reduction stage.

10. The process of claim 6, wherein the calcium oxide product of step (d) is repeatedly subjected to steps (c) and (d) until the calcium oxide is of desired purity and substantially all of the sulfur has been driven off as sulfur dioxide.

11. The process of claim 6, wherein carbon, coal, or coke is mixed with the calcium sulfate to partially accomplish step (c).

12. The process of claim 6, wherein the oxidation step of step (d) is accomplished while the heated oxygen-containing gas and the heated solids are contacted concurrently.

13. The process of claim 6, wherein the solid material passes continuously from reduction to oxidation stages, and wherein the separate identities of the reduction and oxidation atmospheres are maintained by controlling the pressure of the oxidizing and reducing atmospheres in the respective steps.

14. The process of claim 6 wherein the oxygen-containing gas is preheated air.

References Cited

UNITED STATES PATENTS

| | | | |
|---|---|---|---|
| 1,905,326 | 4/1933 | Wilcox | 23—212 |
| 2,529,630 | 11/1950 | Reichl | 23—204CO |
| 3,129,063 | 4/1964 | Zirngibl | 23—177X |

FOREIGN PATENTS

| | | | |
|---|---|---|---|
| 643,479 | 9/1950 | England | 23—177 |

OSCAR R. VERTIZ, Primary Examiner

C. B. RODMAN, Assistant Examiner

U.S. Cl. X.R.

23—186

PO-1050
(5/69)

UNITED STATES PATENT OFFICE
CERTIFICATE OF CORRECTION

Patent No. 3,582,276          Dated October 27, 1971

Inventor(s) Roy Edwin Campbell and Edwin Eddie Fisher

It is certified that error appears in the above-identified patent and that said Letters Patent are hereby corrected as shown below:

In the title, "FROM METAL SULFATE" should be --FROM A METAL SULFATE--;

Column 5, line 8, "tbout" should be --about--;

Column 6, line 1, "Any" should be --An--;

Column 7, line 10, "$CaSO_4$" should be --3 $CaSO_4$--;

line 11, "$1/2+O_2$" should be --1/2 $O_2$--;

line 17, "increases" should be --increase--;

line 27, "2,000° F." should be --2,200° F.--;

Column 8, line 31, "stream" should be --streams--;

Column 11, line 15, "conudit" should be --conduit--;

Column 12, line 3, "stream" should be --steam--;

line 43, "concurrently" should be --cocurrently--;

Column 13, line 19, "concurrently" should be --cocurrently--.

Signed and sealed this 21st day of March 1972.

(SEAL)
Attest:

EDWARD M. FLETCHER, JR.
Attesting Officer

ROBERT GOTTSCHALK
Commissioner of Patents